United States Patent
Shang et al.

(10) Patent No.: US 10,114,848 B2
(45) Date of Patent: Oct. 30, 2018

(54) ENSURING THE SAME COMPLETION STATUS FOR TRANSACTIONS AFTER RECOVERY IN A SYNCHRONOUS REPLICATION ENVIRONMENT

(71) Applicant: SYBASE, INC., Dublin, CA (US)

(72) Inventors: Heping Shang, Walnut Creek, CA (US); Ming-Chen Lo, Fremont, CA (US); Fei Zhou, Northfield, IL (US); Tom Campbell, Lakewood, CO (US); Frank de Lange, Woerden (NL); Guo Gang Ye, Shanghai (CN); Xia-ge Dai, Shanghai (CN)

(73) Assignee: SYBASE, INC., Dublin, CA (US)

( * ) Notice: Subject to any disclaimer, the term of this patent is extended or adjusted under 35 U.S.C. 154(b) by 114 days.

(21) Appl. No.: 15/233,575

(22) Filed: Aug. 10, 2016

(65) Prior Publication Data

US 2016/0350350 A1    Dec. 1, 2016

Related U.S. Application Data

(63) Continuation of application No. 14/315,138, filed on Jun. 25, 2014, now Pat. No. 9,424,145.

(51) Int. Cl.
*G06F 11/00* (2006.01)
*G06F 17/30* (2006.01)
*G06F 11/14* (2006.01)
*G06F 11/16* (2006.01)
*G06F 11/20* (2006.01)

(52) U.S. Cl.
CPC .... *G06F 17/30351* (2013.01); *G06F 11/1448* (2013.01); *G06F 11/1474* (2013.01); *G06F 11/1658* (2013.01); *G06F 17/30368* (2013.01); *G06F 17/30371* (2013.01); *G06F 17/30595* (2013.01); *G06F 11/2094* (2013.01);
(Continued)

(58) Field of Classification Search
CPC .................................................. G06F 11/1469
See application file for complete search history.

(56) References Cited

U.S. PATENT DOCUMENTS 5,781,910 A    7/1998  Gostanian et al.
6,615,219 B1    9/2003  Bruso et al.
(Continued)

OTHER PUBLICATIONS

"U.S. Appl. No. 14/315,138, Non Final Office Action dated Mar. 10, 2016", 9 pgs.
(Continued)

*Primary Examiner* — Christopher S McCarthy
(74) *Attorney, Agent, or Firm* — Schwegman Lundberg & Woessner, P.A.

(57) ABSTRACT

Disclosed in some examples is a method, the method including detecting that an RDMS is recovering from a failure; sending a request for a last committed transaction on a replication component to the replication component; receiving, from the replication component, the last committed transaction which identifies a transaction that was the last committed transaction at a replication component at a time of RDMS failure; determining that a transaction log on the RDMS includes a transaction that had not yet been replicated at the time of RDMS failure which was committed on the transaction log subsequent to the last committed transaction received from the replication component; and based on that determination rolling back the transaction that had not yet been replicated at the time of RDMS failure.

20 Claims, 4 Drawing Sheets

(52) U.S. Cl.
CPC .... *G06F 2201/80* (2013.01); *G06F 2201/805* (2013.01); *G06F 2201/82* (2013.01)

(56) References Cited

U.S. PATENT DOCUMENTS

| | | |
|---|---|---|
| 6,651,073 B1 | 11/2003 | Lyle et al. |
| 6,816,873 B2 | 11/2004 | Cotner et al. |
| 8,909,604 B1 | 12/2014 | Holenstein et al. |
| 9,424,145 B2 | 8/2016 | Shang et al. |
| 2002/0174108 A1 | 11/2002 | Cotner et al. |
| 2004/0243558 A1 | 12/2004 | Nelson et al. |
| 2008/0114816 A1 | 5/2008 | Shepherd et al. |
| 2014/0250085 A1 | 9/2014 | Sorenson et al. |
| 2015/0205850 A1 | 7/2015 | Lu et al. |
| 2015/0378840 A1 | 12/2015 | Shang et al. |

OTHER PUBLICATIONS

"U.S. Appl. No. 14/315,138, Notice of Allowance dated Jun. 23, 2016", 7 pgs.
"U.S. Appl. No. 14/315,138, Response filed May 20, 2016 to Non Final Office Action dated Mar. 10, 2016", 12 pgs.

ENSURING THE SAME COMPLETION STATUS FOR TRANSACTIONS AFTER RECOVERY IN A SYNCHRONOUS REPLICATION ENVIRONMENT

CROSS-REFERENCE TO RELATED APPLICATIONS

This application is a continuation of prior application Ser. No. 14/315,138, filed on Jun. 25, 2014, which is incorporated by reference herein in its entirety.

BACKGROUND

A Relational Database Management System (RDMS) is a database management system that is based on the relational database model. A database management system can be a software application (which can execute on one or more hardware resources) providing the interface between user database tasks and a database or databases. The RDMS provides for storing data in a database, defining and manipulating data structures from the database, updating data in the database, deleting data in the database, inserting data in the database, retrieving data from the database, administering the database and other functions. One of the main goals of an RDMS is to ensure database Atomicity, Consistency, Integrity, and Duration—also known by the acronym ACID. ACID properties ensure that database transactions are processed reliably.

An RDMS operates on the concept of transactions. A transaction is a unit of work performed within a database management system against a database, and is treated in a coherent and reliable way independent of other transactions. A transaction typically ends with the issuance of a COMMIT instruction.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Disclosed herein are some examples of methods, systems, machines (e.g., RDMS, replication components), and machine-readable mediums which are capable of enhancing data continuity in a situation in which an RDMS and a replication component which assists in replicating one or more databases on the RDMS are not in agreement on the state of one of the replicated databases after the RDMS recovers from a failure event.

Figure 1:
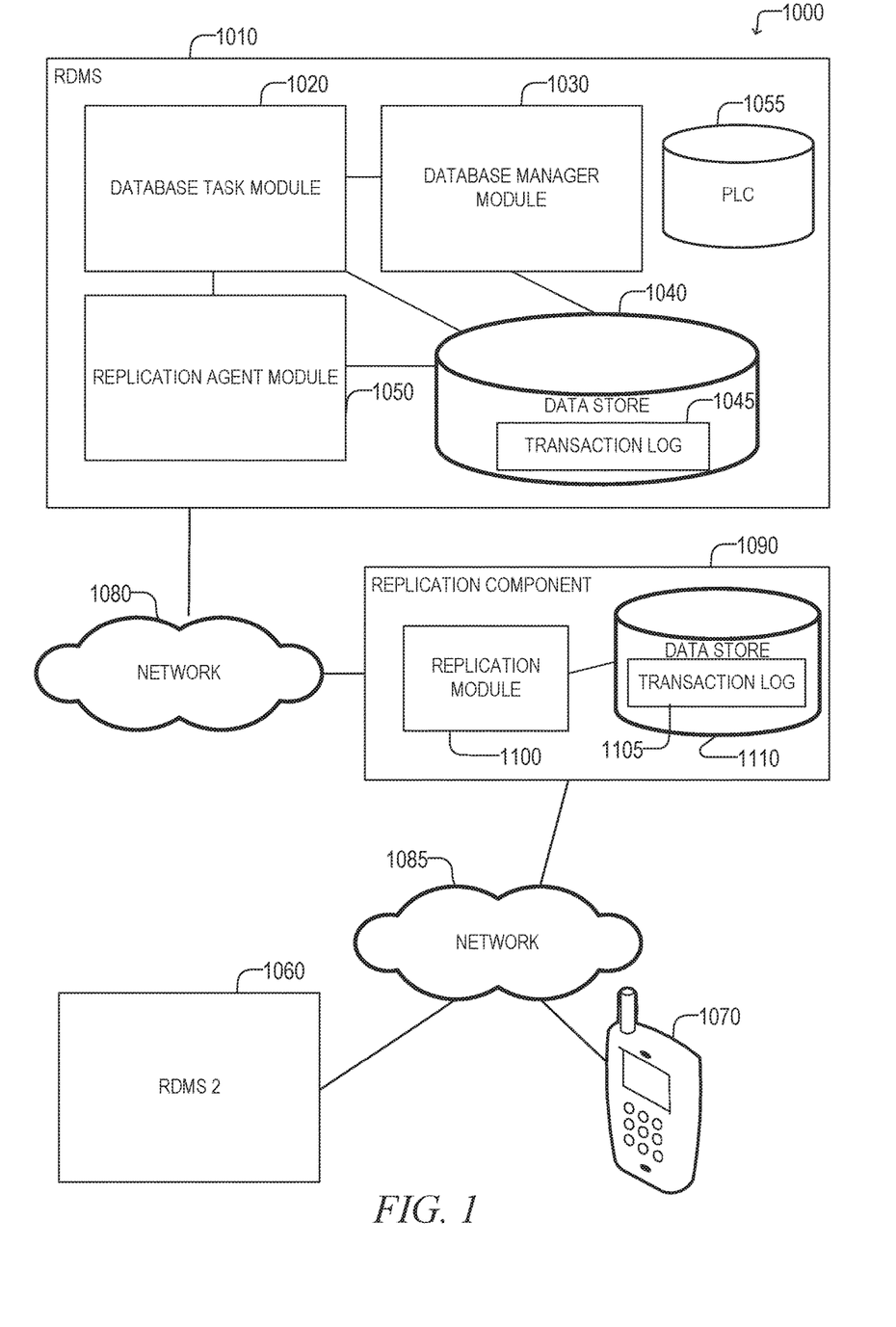
FIG. 1 shows a schematic of a replication RDMS database system according to an example embodiment.

FIG. 1 shows a schematic of a replication database system 1000 according to an example embodiment. Embodiments describe an RDMS system 1010 featuring database replication. The RDMS 1010 can include one or more data stores 1040 that may store one or more structured relational databases (hereinafter referred to as "database" or "databases"). The RDMS 1000 may include or be executed on one or more computing systems. The RDMS 1010 can include a database manager module 1030 and one or more data stores 1040. The database manager module 1030 manages data stored in the data store 1040. For example, the database manager module 1030 can organize, track, and control data stored in the data store 1040 to form the one or more structured relational databases.

Database replication involves replication of transactions in an RDMS 1010 across one or multiple databases (e.g., on other RDMSs 1060) to allow for multiple copies of the database to be stored in multiple electronic locations. The RDMS 1010 can include a replication agent module 1050 to replicate transactions to one or more other RDMS 1060 or other devices 1070 (e.g., a mobile device, smartphone, desktop, tablet computer, laptop computer, and the like) through a replication component 1090. Embodiments provide distributed access to allow information (e.g., data stored in data store 1040) to be better shared, and to provide backup copies of the database. Replication of transactions from the database (e.g., database in data store 1040) in the RDMS 1010 can be achieved by the replication component 1090. Replication agent module 1050, database manager module 1030, database task module 1020 may reside on one or more computing systems of the RDMS 1010.

The RDMS 1010 replicates changes in the database, via the replication agent module 1050, to the replication component 1090. The replication component 1090 can replicate the data (e.g., changes in the database) towards other copies of the database stored in other electronic locations.

Database tasks (e.g., database task module 1020), running on the RDMS 1010, implement functionality and can modify the database (e.g., through Simply Query Language (SQL) instructions). These modifications are made by the RDMS 1010 by writing database commands to a transaction log 1045 for the database kept by the RDMS 1010. The transaction log 1045 can be stored on the data store 1040 of the RDMS 1010 and can comprise a series of database commands.

The RDMS 1010 can include one or more user database task modules 1020. The database task modules 1020 can be any process, thread, or program which can make changes to the databases stored in data store 1040 and managed by the database manager module 1030. The database task module 1020 can provide one or more services to users (e.g., clients) using the data stored in the data store 1040, The database task module 1020 can read from, write to, and modify data in the data store 1040 by issuing commands to the database manager module 1030. In some example embodiments, the database task module 1020 can use one or more Structured Query Language (SQL) commands to access and modify data stored in the data store 1040.

A "Private Lo ache" (PLC) 1055 also known as a "User Log Cache" can be stored in memory of the RDMS 1010. The PLC 1055 may be stored in either volatile or non-volatile memory. :For example, the PLC 1055 may be stored in volatile memory (e.g., Random Access Memory). In some examples, each particular database task module 1020 may have a PLC 1055 associated with it which may be stored in RAM associated with the particular task module 1020. The PLC 1055 may collect commands written by the database task module 1020.

As there may be multiple database tasks (e.g., multiple instances of database task module 1020) writing to the transaction log (e.g., transaction log 1045) simultaneously (or near simultaneously), cause contention-based delays may occur while waiting for access to write to the transaction log. Scalability and performance of replication may be improved by having each database task first write database commands to a PLC 1055. The PLC 1055 can be flushed by the RDMS 1010 to the transaction log 1045 and ultimately written to disk at various times and in response to various triggering events. For example, the PLC 1055 can be flushed if the PLC is full, if a transaction is committed as a result of a commit SQL command, or the like. Once the PLC is flushed, the database manager module 1030 can log the changes made to the data store 1040 in a transaction log which can be stored in the data store 1040.

To perform replication, the RDMS 1010 can send changes made to the transaction log 1045 to the replication component 1090. The replication component 1090 can, for example, store these changes in a transaction log of its own 1105. For example, the transaction log may be stored in a simple persistent queue (SPQ) in a data store 1110 at the replication component 1090. The SPQ can disseminate the transaction log 1105 to other electronic sites, such as other RDMSs 1060.

While writing the PLC 1055 to the transaction log 1045 and ultimately to disk, the RDMS 1010 can replicate the updates to the replication component 1090. For an asynchronous replication, the database task (e.g., database task module 1020) can continue as soon as the transaction is written to disk. For a synchronous replication, the database task should block waiting for the RDMS 1010 to replicate the transaction log 1045 to the replication component 1090 and for the RDMS 1010 to write the transaction log 1045 to disk. In order to reduce the latency in this process, the flush of the transaction log 1045 to disk and the replication of the transaction log 1045 to the replication component 1090 can be done in parallel.

A replication agent module 1050 can monitor the PLC 1055 for transactions marked for replication. The replication agent module 1050 can replicate these transactions to one or more other RDMSs 1060 or other devices 1070. For example, the replication agent module 1050 can send information on transactions marked for replication, as well as information on which transactions have already been written to the transaction log on disk. In addition, the replication agent module 1050 can determine when to notify database task module 1020 when a database commit transaction is completed. For example, in an asynchronous replication mode, the replication agent module 1050 can return success to the database task module 1020 once the transaction is written to the data store 1040. In a synchronous replication mode, the replication agent module 1050 can wait for both confirmation that the transaction was written to the transaction log 1045 (e.g., a disk I/O (input/output) is complete) as well as confirmation from the replication component 1090. The replication component 1090 can be accessible over a packet-based network 1080 (e.g., the internet, a local area network, a wide area network, or the like). In some example embodiments, the replication agent module 3050 can determine changes to the data store 3040 based upon the transaction log managed by the database manager module 3030.

As a result of this design, some transactions can be replicated before they are written to disk, and other transactions can be written to disk before they are replicated. For example, the replication component 1090 can return a confirmation to the RDMS 1010 prior to a disk I/O (input/output) completion for the transaction log 1045 or vice versa. Accordingly, at any given moment, the following four situations are possible:

1. The transactions in the transaction log 1045 and the transaction log 1105 on the replication component 1090 are the same.
2. A transaction has not been written to either the transaction lo 1045 or the transaction log 1115 on the replication component.
3. A transaction has been written to the transaction log 1045 for example, when a disk I/O is complete, but not to the transaction log 1105 on the replication component.
4. A transaction has been written to the transaction log 1105 on the replication component but not the transaction log 1045.

Situations one and two represent a state of events in which both the transaction log 1045 on the RDMS 1010 and the transaction log 1105 on the replication component 1090 are the same. For situation three, the RDMS 1010 can notify the replication component 1090 about the transaction and move to situation one where both the RDMS 1010 and the replication component 1090 are in sync, Situation four can occur if the changes to the transaction log 1045 were sent to the replication component prior to being written to disk. This can cause a transaction, which is not yet written to the transaction log 1045 (situation four) of RDMS 1010, to be written to the transaction log 1105 of replication component 1090. Once the process that writes the database transactions to disk on the local RDMS 1010 catches up, situation four would be corrected. For situation three and four, the transaction will not be considered committed until these situations resolve themselves and move to situation 1.

As can be appreciated from the above discussion, situations where the RDMS 1010 and the replication component 1090 are not in sync are usually temporary and are likely to be quickly resolved. However, if the RDMS 1010 were to become unavailable prior to the resolution of one of those situations, the RDMS 1010 and the replication component 1090 can become out of sync at the time the RDMS 1010 went out of service. If the RDMS 1010 is down for a short time period, specialized messaging protocols can ensure that the RDMS 1010 and the replication component resynchronize. If the primary (active RDMS (e.g., RDMS 1010) is down for a longer period of time, operations can be switched to a standby RDMS (e.g., RDMS 1060). The database in RDMS 1010 may be replicated to the standby RDMS 1060, and the standby RDMS 1060 can then replace RDMS 1010 as the primary (active) RDMS. When the RDMS that was previously the primary RDMS (eng., RDMS 1010) comes back in service, in some examples this RDMS will come back as a standby RDMS. In order to be a standby RDMS, in some examples, the standby resynchronizes with the replication component. The standby RDMS (which was the active RDMS before failure, such as RDMS 1010) will not be aware of transactions that it sent to the replication component 1090 that were not also stored to the transaction log 1045 on disk prior to failing because the changes to the database had not been moved out of volatile memory to disk and were therefore lost. The replication component 1090 and the newly active RDMS will not be aware of any transactions that were stored to disk of the current standby RDMS (which was the active RDMS before failure, such as RDMS 1010), but that were not sent to the replication component 1090. In the time it takes for the failed RDMS (e.g., RDMS 1010) to come back in service and to assume the standby role, additional transactions could have been processed by the newly active RDMS (e.g., RDMS 1060).

For example, assuming data is being replicated from RDMS 1010 which is the active RDMS, to RDMS 1060, which is a standby RDMS, if RDMS 1010 and RDMS 1060 are in sync, and RDMS 1010 goes down and then comes back up, RDMS 1010 switches to standby and RDMS 1060 switches to active. Transactions can then replicate (using the replication component 1090) from RDMS 1060 to RDMS 1010. If, however, at the time that RDMS 1010 fails, a transaction X was stored on disk in the local transaction log 1045, but was not replicated in the transaction log 1105 of the replication component (situation 3), then RDMS 1060 will not know about the transaction. When RDMS 1010 restarts it will have the extra transaction X and the replication database system 1000 should not replicate from RDMS 1060 to RDMS 1010. Similarly, if at the time that RDMS 1010 fails, the transaction X was stored in the transaction log 1105 (e.g., the SPQ) of the replication component but transaction X was not written to the RDMS 1010 disk (situation 4), then the replication database system should not replicate RDMS 1060 to RDMS 1010.

The example embodiments disclosed herein can address situations three and four described above so that they can be handled appropriately to preserve the ACID properties of the RDMS' 1010 and 1060. In some example embodiments to address situation three, when the RDMS (e.g., RDMS 1010) that failed comes back online (as a standby RDMS), the RDMS 1010 can exchange information with the replication component 1090 to determine the last committed transaction that had reached the replication component 1090 at the time of failure. Any transactions written in the transaction log 1045 (e.g., to disk) on RDMS 1010, but not at the replication component 1090 at the time of failure of RDMS 1010, are rolled back at that RDMS. In some examples, the transactions are rolled back by inserting one or more log records which reverse the work of the transaction. In some example embodiments, to address situation four, the replication component 1090 also queries the RDMS 1010 to determine the last committed transaction in the transaction log 1045 of the RDMS 1010. The replication component 1090 can replicate to the RDMS 1010 any transactions that had reached the replication component 1090 but were not stored to disk in the transaction log 1045 of the RDMS 1010 at the time of failure of the RDMS 1010. These transactions are reapplied to the database on the RDMS 1010. Once both the RDMS 1010 and the replication component 1090 are in sync as of the time of failure of the RDMS 1010, any new transactions committed by a second, newly active, RDMS 1060 (which may have switched from being a standby at the time of failure of the primary), which were processed after the failure of the RDMS 1010, can be replicated to the RDMS 1060 from the replication component 1090.

Replication operations can utilize the replication component 1090 to assist in replicating data from the data store 1040 to the other RDMSs 1060, the devices 1070, and the like. The RDMS 1060 and the device 1070 can be connected to the replication component 1090 through the network 1085. The network 1085 can be, or include, portions of the network 1080. The replication component 1090 can include a replication module 1100 and a data store 1110. The replication module 1100 can communicate with the replication agent module 1050 from the RDMS 1010 and other replication agent modules on the devices 1070 and the RDMS 1060. The replication module 1100 can receive subscription requests from devices that wish to receive updates to the data and when updates are reported by a replication agent (e.g., the replication agent module 1050), the replication module 1100 can update the data in its local data store 1110 and can send updates to subscribed devices based upon device subscriptions. The replication module 1100 can respond to a device which updates the database with a confirmation upon receipt of an indication describing the change. In other examples, the confirmation may be sent upon storage of the update. Replication component 1090 can be or include one or more computing systems which may execute the replication module 1100 and communicate with or provide data store 1110.

The replication agent module 1050 can also receive information on updates to data stored in other data stores associated with other RDMSs, such as the RDMS 1060, the devices 1070 and the like. The replication agent module 1050 can subscribe to receive updates to data on the data store 1040 with the replication component 1090 so as to receive updates from other devices which can update the data. The replication agent module 1050 can notify the database task module 1020, the database manager module 1030 or other processes on the RDMS 1010 of any received changes. The replication agent module 1050 can then commit received changes to the data store 1040 either directly or through the database manager module 1030 or the database task module 1020.

The replication agent module 1050 can assist in resynchronizing with the replication component 1090 after failure of an RDMS and during the subsequent recovery. For example, the replication agent module 1050 can query the replication module 1100 of the replication component 1090 to determine the last committed. transaction on the replication component 1090, The replication agent module 1050 can then rollback any transactions committed at the RDMS 1010 but not at the replication component 1090. The replication agent module 1050 can do this by working with the database manager module 1030 to change COMMIT instructions for transactions committed after the last committed transaction on the replication component 1090 in the transaction log to NO-OP instructions, utilizing clear transactions for database commands and ABORT commands for transactions that remained open after the last confirmed transaction. The replication agent module 1050 can also work with replication module 1100 respond to inquiries from the replication module 1100 to provide a last committed transaction for the transaction log. The replication module 1100 can utilize the last committed transaction to determine which transactions were replicated to the replication component 1090 but were not written to the transaction log 1045 of the RDMS 1010. The replication component 1090 can send these transactions to the replication agent module 1050. The replication agent module 1050 can work with the database manager module 1030 to apply these transactions to the transaction log. The replication agent module 1050 can also register with the replication component 1090 to replicate the database of RDMS 2 1060 upon returning from failure as a standby RDMS 1010.

The RDMS 1010 can include additional modules not shown which manage the database, execute SQL statements, manage the database task module 1020, and the like. Further, in some example embodiments, one or more modules may be combined.

Figure 2:
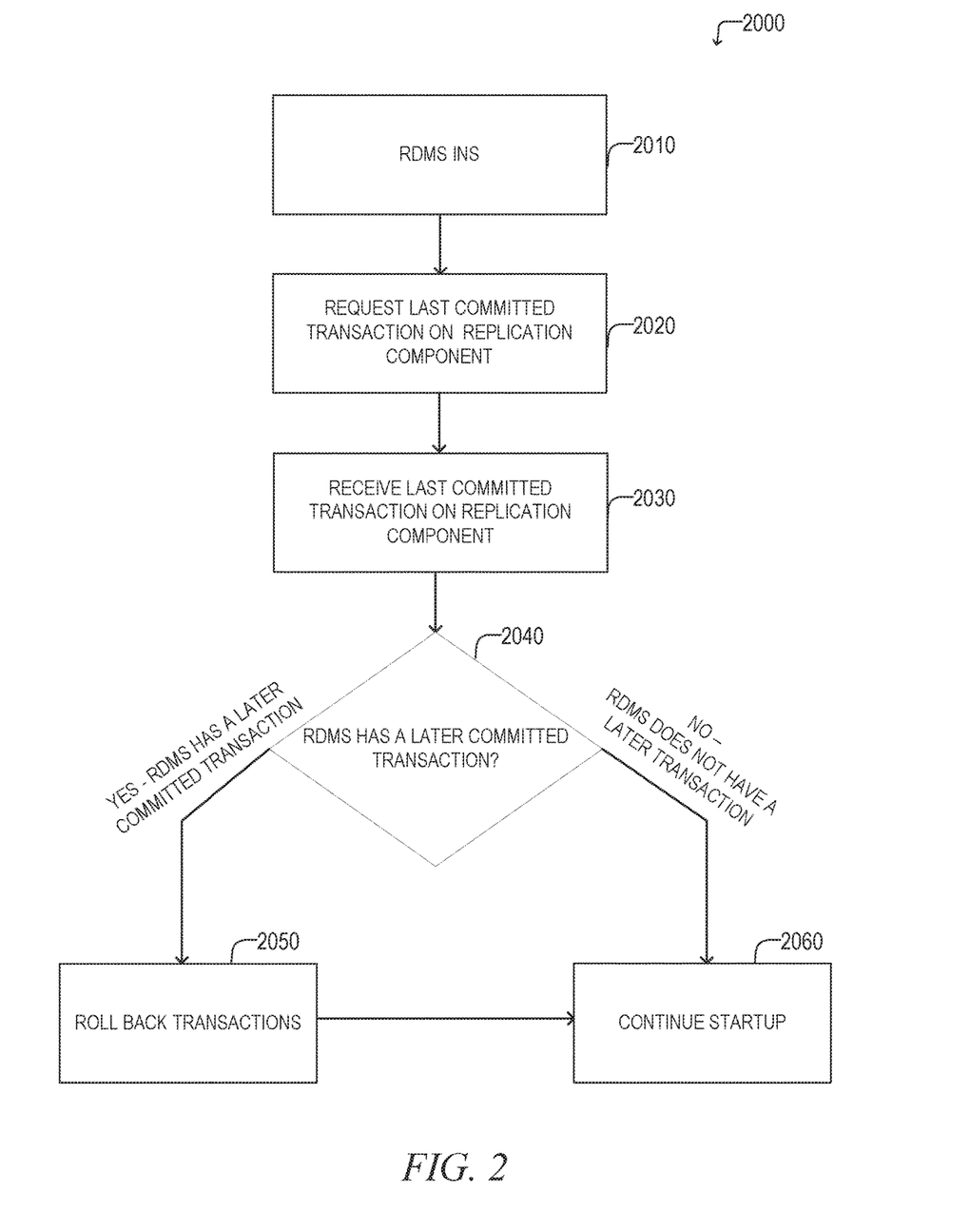
FIG. 2 shows a flowchart of a method, in accordance with an example embodiment, performed by an RDMS to resynchronize the RDMS with a replication component.

FIG. 2 shows a flowchart of a method 2000, in accordance with an example embodiment, performed by an RDMS (e.g., RDMS 1010 in FIG. 1) to resynchronize the RDMS with a replication component (e.g., replication component 1090 in FIG. 1). The method 2000 can be performed by processing logic that can comprise hardware (e.g., circuitry, dedicated logic, programmable logic, microcode, etc.), software (e.g., instructions run on a processing device), or a combination thereof. At operation 2010, the RDMS goes in-service (INS) after previously being out of service. The RDMS then, as shown at operation 2020, can request the last committed transaction at the time of failure from the replication component for the database managed by the RDMS.

At operation 2030, the RDMS can receive the response from the replication component which includes the last committed transaction for the database at the time of failure of the RDMS. At decision 2040, the RDMS can determine whether the RDMS has a later committed transaction. The RDMS can compare the last committed transaction in its transaction log with the last committed transaction at the time of RDMS failure received from the replication component. If the last committed transaction in the local transaction log and the last committed transaction in the replication component are the same (decision 2040), then startup of the RDMS continues at operation 2060, If the RDMS has a later transaction than the replication component (decision 2040), the RDMS can rollback these later transactions, as shown at operation 2050, and continue startup at operation 2060. For example, if the RDMS transaction log has transaction 1, 2, 3 and 4 committed, and if the last committed transaction at the time of failure of the RDMS at the replication component is transaction 4, then the databases were in sync at the time the RDMS failed. If instead, the last committed transaction at the time of failure of the RDMS at the replication component is transaction 2, then the RDMS rolls back transactions 3 and 4 from the database.

As an example rollback operation, assume that at the time of the RDMS failure, the database on the RDMS site had four transactions: T1 is the last committed transaction in the replication component at the time of RDMS failure; T2 was committed after T1, but had not yet been replicated to the replication component at the time of the failure; T3NR is a transaction which is not replicated; and T4 is a transaction that is not committed at the time of the RDMS failure; and the transaction log of the RDMS contained the following example entries upon restart:

Begin transaction T1
Insert (T1)
Begin Transaction T2
Insert (T2)
*Commit (T1)<=Last Com. Trans. at the External R Comp.
Commit (T2)
Begin Transaction T3NR
Begin Transaction T4
Insert (T4)
Insert (T3NR)
Commit (T3NR)

First, the commit record of transaction T2 (and any commit after the last committed transaction at the external replication component can be changed to a NO-OP. Thus the transaction log can be changed (e.g., by the database manager module 1030, the replication agent module 1050, or the like) at operation 2050 to:

Begin transaction T1
Insert (T1)
Begin Transaction T2
Insert (T2)
*Commit (T1)<=Last Com. Trans. at the External Rep. Comp.
NOOP (T2)
Begin Transaction T3NR
Begin Transaction T4
Insert (T4)
Insert (T3NR)
Commit (T3NR)

As transaction T3NR is a transaction that is not replicated, the .RDMS does not have to update the replication component about the T3NR transaction, thus this transaction may be left as-is. The commands of the transaction T4 (and any other open transactions as of the time of RDMS failure) should be rolled back, for example, at operation 2050. For T2, even though T2 is committed in the transaction log at the time of the failure, since its COMMIT record was changed to a NOOP record, this transaction will be treated by the RDMS as an open transaction as well. Commands in these transactions may be cleared with a CLR command. Finally, an ABORT log record is written to the transaction log to indicate the end status of these transactions. For example:

Begin transaction T1
Insert (T1)
Begin Transaction T2
Insert (T2)
*Commit (T1)<=Last Corn. Trans. at the External Rep. Comp,
NOOP (T2)
Begin Transaction T3NR
Begin Transaction T4
Insert (T4)
Insert (T3NR)
Commit (T3NR)
CLR(INS T4)
ABORT (T4)
CLR(INS T2)
ABORT(T2)

Returning to FIG. 2, once the appropriate transactions have been rolled back at operation 2050, the method 2000 proceeds to operation 2060 to continue the startup procedures of the RDMS.

In some example embodiments, the RDMS can manage multiple databases. Accordingly, the RDMS can perform the method 2000 for each of the different databases that are managed by the RDMS, In some example embodiments, different databases that are managed b the same RDMS can replicate to different replication components. In these examples, the RDMS can contact the replication component corresponding to the particular database the RDMS is trying to synchronize (e.g., see operation 2020) in order to determine the last committed transaction for each database.

Once the RDMS has completed the recovery for every user database by rolling back the committed transactions that were not replicated in the replication component, and the open transactions at the time of failure (e.g., see situation three), the RDMS can begin operating in the standby role. Before the replication direction is switched from the old standby (newly primary RDMS) to the new standby (old primary RDMS), the replication component can perform operations to ensure that any transactions replicated to the replication component, but not written to the transaction log of the old primary RDMS (e.g., see situation four), are written back to the RDMS.

Figure 3:
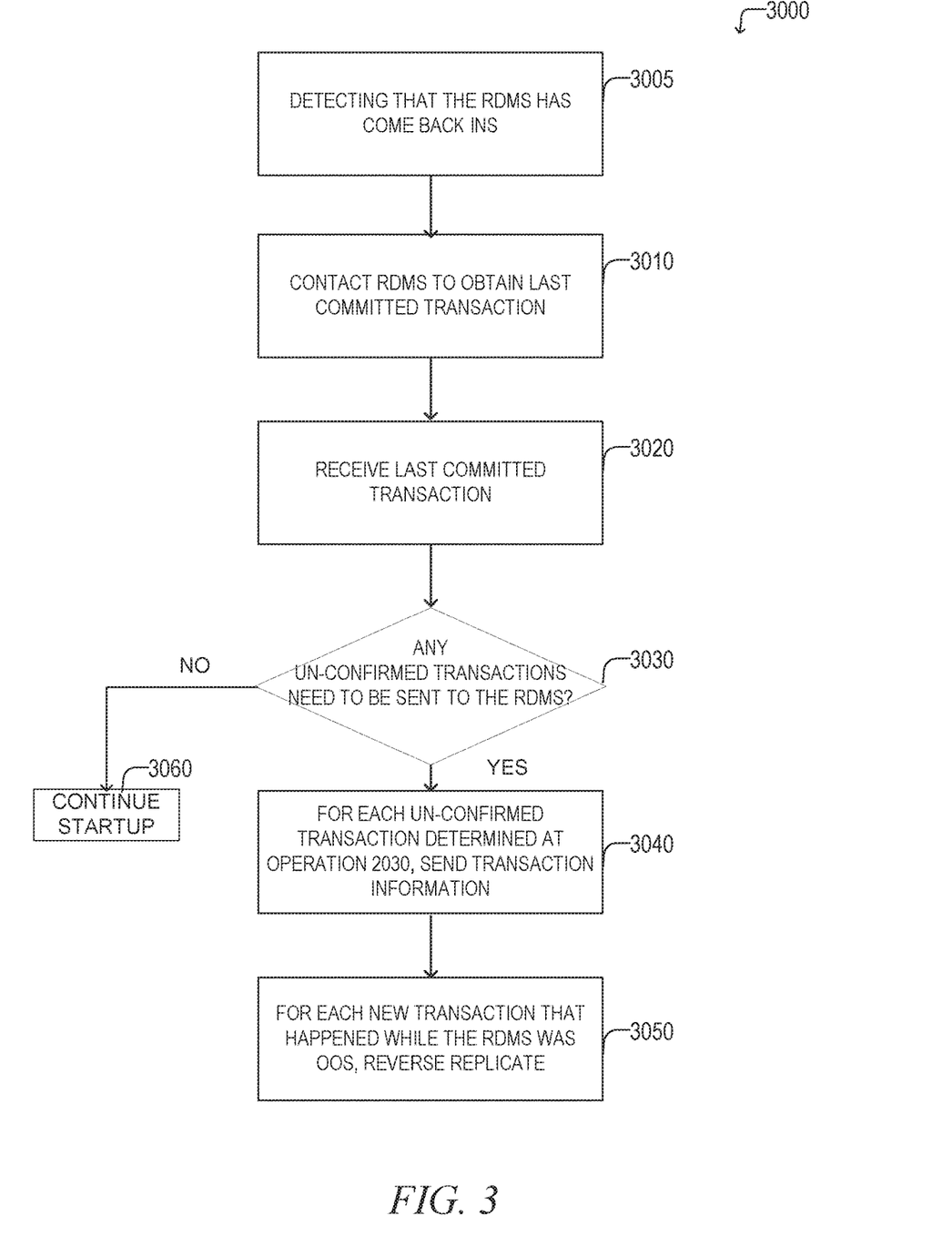
FIG. 3 shows a flowchart of a method, in accordance with an example embodiment, performed by a replication component to resynchronize the replication component with an RDMS.

FIG. 3 shows a flowchart of a method 3000, in accordance with an example embodiment, performed by a replication component (e.g., replication component 1090 in FIG. 1) to resynchronize the replication component with an RDMS (e.g., RDMS 1010 in FIG. 1). The method 3000 can be performed by processing logic that can comprise hardware (e.g., circuitry, dedicated logic, programmable logic, microcode, etc.), software (e.g., instructions run on a processing device), or a combination thereof At operation 3005, the replication component can detect that the RDMS has come back in service after being out of service long enough to trigger a switchover of a standby RDMS to be an active RDMS (and the subsequent recovery of the previously active RDMS puts that RDMS in a standby mode). In some example embodiments, the replication component can be notified of this by a disaster recovery (DR) component on the RDMS.

If the RDMS comes back in service prior to a switchover of the standby RDMS to being an active RDMS, the remaining steps of FIG. 3 may not be performed. In these examples the external replication component will not replicate any unconfirmed commands back to the RDMS. In these examples, when the RDMS comes back online, the replication component will skip all unconfirmed commands as it expects the RDMS to resend those commands if there were committed but not yet confirmed to replication component. The external replication component will not replicate unconfirmed commands and therefore, there will be no unconfirmed commands being applied back to an active RDMS.

If the RDMS was down long enough to trigger switchover, and subsequence to the external replication component being notified of this at operation 3005, as shown at operation 3010, the replication component can contact the RDMS to obtain the last committed transaction on the RDMS' transaction log. The replication component can receive the last committed transaction on the RDMS' transaction log from the RDMS (see operation 3020). The value received from the RDMS at operation 3020 can be the same value as that returned by the replication component at operation 2030 in FIG. 2 or can be a different value. The value returned would be the same if the RDMS and the replication component were in sync at the time of failure, or if the RDMS had more transactions committed than the replication component at the time of failure. In this latter case, the RDMS would have previously rolled back any additional transactions (e.g., using the method 2000 of FIG. 2) such that the latest transaction would have been the latest committed transaction at the replication component at the time of RDMS failure. In other examples, if the replication component has more transactions than the RDMS, the value returned can be less than the last committed transaction at the replication component.

In some example embodiments, transactions received from the RDMS on the replication component can be considered by the replication component as confirmed or unconfirmed. When an RDMS is replicating with a replication component, the changes to the transaction log can be sent in replication packages. Each replication package can contain one or more commands. Each command contains a monotonically increasing unique command identifier. The replication package can also contain an identifier of the last committed transaction that was written to the disk of the RDMS. As already noted, the tasks on the RDMS that are writing to the transaction log and the tasks on the RDMS that are sending the replication packages to the replication component can run in parallel. Thus, it can be the case that the last transaction identifier written to disk is less than the last transaction identifier in the replication package. The replication component can consider transactions with a unique command identifier that is greater than the identifier of the last command written to disk as "unconfirmed" transactions. In an example embodiment, the replication component does not replicate transactions to other RDMSs that are not confirmed. If an RDMS goes down (and does not immediately come back up) or is otherwise unavailable, and if the replication database system switches the standby RDMS to the active RDMS all unconfirmed transactions in the replication component can be assumed to be committed.

At operation 3020, the replication component can receive the last committed transaction at the RDMS. Thereafter, at operation 3030, the last committed transaction of the RDMS is compared to any unconfirmed transactions at the time of RDMS failure on the replication component. If any of the unconfirmed transactions are not committed on the RDMS, then these transactions are sent to the RDMS (as the replication component assumed that those transactions were committed when the RDMS failed). For each unconfirmed transaction that is sent to the RDMS, information on the transaction (e.g., the commands) can be sent to the RDMS (see operation 3040). If there are no new unconfirmed transactions at operation 3030, then the RDMS may continue startup procedures at operation 3060.

Once the RDMS receives these transactions, the RDMS and the replication component should then be synchronized as of the time when the RDMS went out of service. Thereafter, at operation 3050, any transactions that occurred on the new active RDMS (old standby RDMS) while the RDMS was down, can be replicated to the standby RDMS (old active RDMS) to bring the standby RDMS (old active RDMS) into complete synchronization.

Figure 4:
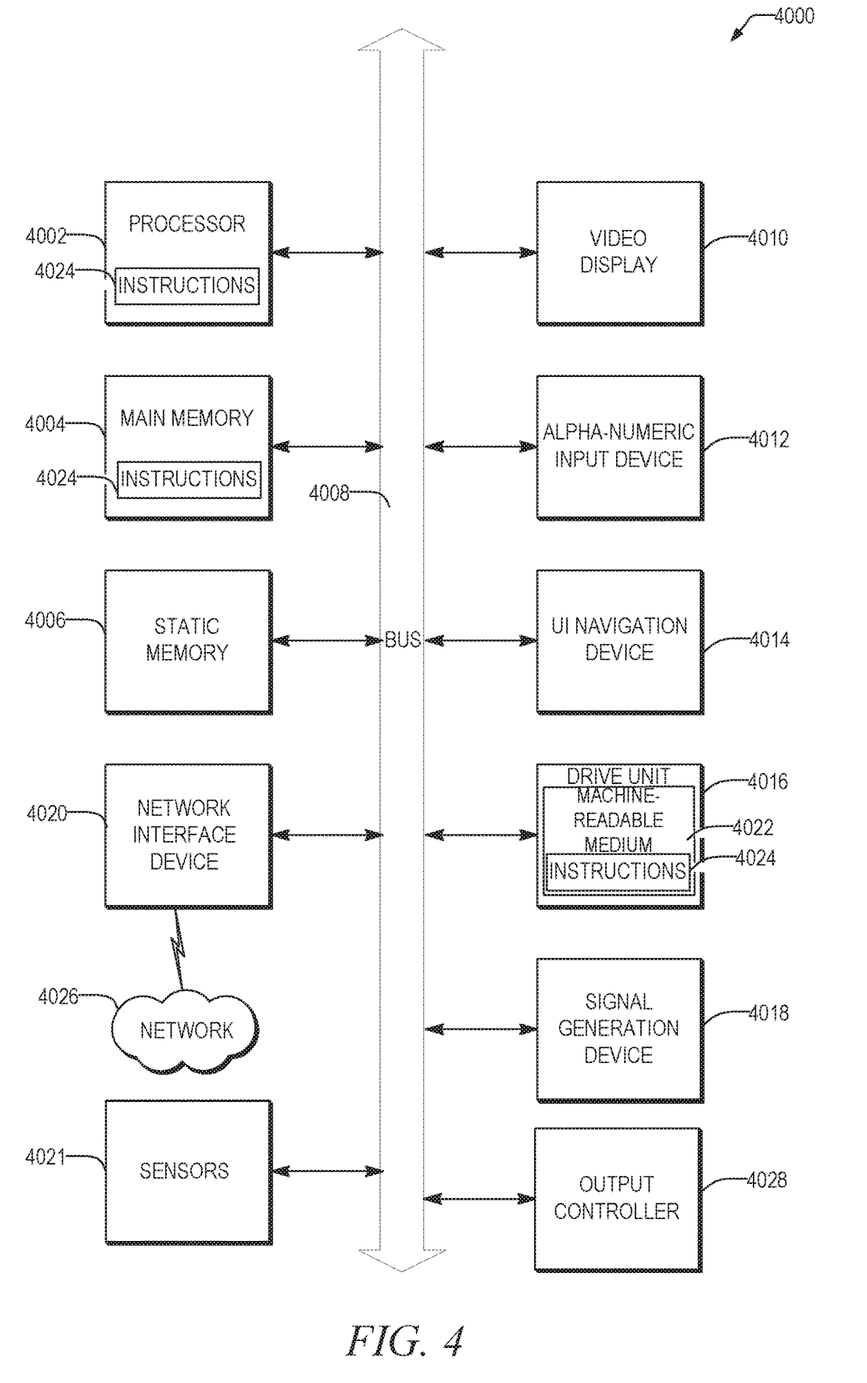
FIG. 4 shows a schematic of an example machine upon which any one or more of the techniques (e.g., methodologies) discussed herein can be performed according to some example embodiments.

FIG. 4 illustrates a block diagram of an example machine 4000 upon which any one or more of the techniques (e.g., methodologies) discussed herein can be performed. In alternative embodiments, the machine 4000 can operate as a standalone device or can be connected (e.g., networked) to other machines. In a networked deployment, the machine 4000 can operate in the capacity of a server machine, a client machine, or both in server-client network environments. In an example, the machine 4000 can act as a peer machine in peer-to-peer (P2P) (or other distributed) network environment. The machine 4000 can be a RDMS, a replication component, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems e.g., a standalone, client or server computer system) or one or more hardware processors can be configured by firmware or software (e.g., instructions, an application portion, or an application) as a module that operates to perform specified operations. In an example, the software can reside on a machine readable medium. In an example, the software, when executed by the underlying hardware of the module, causes the hardware to perform the specified operations, Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 4000 can include a hardware processor 4002 (e.g., a central processing unit (CPU), a graphics processing unit (GPU), a hardware processor core, or any combination thereof), a main memory 4004 and a static memory 4006, some or all of which can communicate with each other via an interlink (e.g., bus) 4008. The machine 4000 can further include a video display 4010, an alphanumeric input device 4012 (e.g., a keyboard), and a user interface (UI) navigation device 4014 (e.g., a mouse). In an example, the video display 4010, alphanumeric input device 4012 and UI navigation device 4014 can be a touch screen display. The machine 4000 can additionally include a storage device (e.g., drive unit) 4016, a signal generation device 4018 (e.g., a speaker), a network interface device 4020, and one or more sensors 4021, such as a global positioning system (GPS) sensor, compass, accelerometer, or other sensor. The machine 4000 can include an output controller 4028, such as a serial (e.g., universal serial bus (USB), parallel, or other wired or wireless (e.g., infrared (IR), near field communication (NFC), etc. connection to communicate with or control one or more peripheral devices (e.g., a printer, card reader, etc.).

The storage device 4016 can include a machine readable medium 4022 on which is stored one or more sets of data structures or instructions 4024 (e.g., software) embodying or utilized by any one or more of the techniques or functions described herein. The instructions 4024 can also reside, completely or at least partially, within the main memory 4004, within the static memory 4006, or within the hardware processor 4002 during execution thereof by the machine 4000. In an example, one or any combination of the hardware processor 4002, the main memory 4004, the static memory 4006, or the storage device 4016 can constitute machine readable media.

While the machine readable medium 4022 is illustrated as a single medium, the term "machine readable medium" can include a single medium or multiple media (e.g., a centralized or distributed database, and/or associated caches and servers) configured to store the one or more instructions 4024.

The term "machine readable medium" can include any medium that is capable of storing, encoding, or carrying instructions for execution by the machine 4000 and that cause the machine 4000 to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media can include non-transitory machine readable media. In some examples, machine readable media can include machine readable media that is not a transitory propagating signal.

The instructions 4024 can further be transmitted or received over a communications network 4026 using a transmission medium via the network interface device 4020. The machine 4000 can communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4020 can include one or more physical jacks (e.g., Ethernet, coaxial, or phone jacks) or one or more antennas to connect to the communications network 4026. In an example, the network interface device 4020 can include a plurality of antennas to wirelessly communicate using at least one of single-input multiple-output (SIMO), multiple-input multiple-output (MIMO), or multiple-input single-output (MISO) techniques. In some examples, the network interface device 4020 can wirelessly communicate using Multiple User MEMO techniques.

What is claimed is:

1. A computerized method for replicating databases, the method comprising:
    detecting that a relational database management system (RDMS) is in service;
    determining using one or more processors of a replication database system, a last committed transaction for a first data store and a last committed transaction for a second data store;
    determining, using one or more processors of the replication database system, that a transaction log on the RDMS includes a first transaction that had not yet been replicated at the first data store prior to the RDMS being in service and a second transaction from the second data store is unconfirmed at the RDMS; and
    based on determining that the transaction log includes the first transaction and that the second transaction is unconfirmed, resynchronizing the transaction log of the RDMS with the first data store and the second data store.

2. The method of claim 1, wherein the first data store associated with a first replication component and the second data store is associated with a second replication component, and wherein the replication database system is a messaging system using one or more messaging protocols to resynchronize the RDMS with the first replication component and the second replication component.

3. The method of claim 2, wherein determining that the transaction log on the RDMS includes the first transaction that had not yet been replicated at the first data store further comprises:
- transmitting, over a network, a first request for a last committed transaction to a first replication component for the first data store; and
- receiving, from the first replication component, the last committed transaction of the first replication component for the first data store.

4. The method of claim 3, wherein resynchronizing the transaction log of the RDMS with the first data store further comprises:
- rolling back the first transaction that had not yet been replicated at the first data store prior to the RDMS being in service.

5. The method of claim 4, wherein rolling back the first transaction further comprises:
- modifying an entry in the transaction log of the RDMS for the first transaction from an indicator for a committed transaction to an indicator for a non-committed transaction;
- adding a clear command to the entry in the transaction log of the RDMS for the first transaction; and
- adding an abort entry into the transaction log of the RDMS for the first transaction, the abort entry indicating an end status of the first transaction.

6. The method of claim 2, wherein determining that a second transaction from the second data store is unconfirmed at the RDMS further comprises:
- receiving, over a network, a second request for a last committed transaction for the second data store from the second replication component; and
- responsive to receiving the request from the second replication component, sending the last committed transaction for the second data store to the second replication component, the last committed transaction for the second data store being a committed transaction of the transaction log of the RDMS.

7. The method of claim 6, wherein resynchronizing the transaction log of the RDMS with the second data store further comprises:
- replicating the second transaction to the RDMS by reapplying the second transaction to a data store in the RDMS.

8. The method of claim 1, wherein resynchronizing the transaction log of the RDMS the first data store and the second data store further comprises:
- synchronizing the transaction log of the RDMS at a time the RDMS went out of service by replicating the second transaction to the RDMS, and
- replicating one or more transactions to the RDMS from the first data store and the second data store, the one or more transaction occurring between the time the RDMS went out of service and a time at which the RDMS determined to be in service.

9. A replication database system, comprising:
one or more processors; and
a machine-readable medium that stores instructions, which when performed by the one or more processors, causes the one or more processors to perform operations comprising:
- detecting that a relational database management system (RDMS) is in service;
- determining a last committed transaction for a first data store and a last committed transaction for a second data store;
- determining, using one or more processors, that a transaction log on the RDMS includes a first transaction that had not yet been replicated at the first data store prior to the RDMS being in service and a second transaction from the second data store is unconfirmed at the RDMS; and
- based on determining that the transaction log includes the first transaction and that the second transaction is unconfirmed, synchronizing the transaction log of the RDMS with the first data store and the second data store.

10. The replication database system of claim 9, wherein the first data store is associated with a first replication component and the second data store is associated with a second replication component, and wherein the replication database system is a messaging system using one or more messaging protocols to resynchronize the RDMS with the first replication component and the second replication component.

11. The replication database system a claim 10, wherein determining that the transaction log on the RDMS includes the first transaction that had not yet been replicated at the first data store further comprises:
- transmitting, over a network, a first request for a last committed transaction to a first replication component for the first data store; and
- receiving, from the first replication component, the last committed transaction of the first replication component for the first data store.

12. The replication database system of claim 11, wherein resynchronizing the transaction log of the RDMS with the first data store further comprises:
- rolling back the first transaction that had not yet been replicated at the first data store prior to the RDMS being in service.

13. The replication database system of claim 10, wherein determining that a second transaction from the second data store is unconfirmed at the RDMS further comprises:
- receiving, over a network, a second request for a last committed transaction for the second data store from the second replication component; and
- responsive to receiving the request from the second replication component, sending the last committed transaction for the second data store to the second replication component, the last committed transaction for the second data store being a committed transaction of the transaction log of the RDMS.

14. The replication database system of claim 13, wherein resynchronizing the transaction log of the RDMS with the second data store further comprises:
- replicating the second transaction to the RDMS by reapplying the second transaction to a data store in the RDMS.

15. A non-transitory machine-readable storage medium that stores instructions, which when performed by one or more processors, causes the one or more processors to perform operations comprising:
- detecting that a relational database management system (RDMS) is in service;
- determining, using one or more processors of a replication database system, a last committed transaction for a first data store and a last committed transaction or a second data store;
- determining, using one or more processors of the replication database system, that a transaction log on the RDMS includes a first transaction that had not yet been replicated at the first data store prior to the RDMS being in service and a second transaction from the second data store is unconfirmed at the RDMS; and based on determining that the transaction log includes the first transaction and that the second transaction is unconfirmed, resynchronizing the transaction log of the RDMS with the first data store and the second data store.

16. The non-transitory machine-readable storage medium of claim 15, wherein the first data store is associated with a first replication component and the second data store is associated with a second replication component, and wherein the replication database system is a messaging system using one or more messaging protocols to resynchronize the RDMS with the first replication component and the second replication component.

17. The non-transitory machine-readable storage medium of claim 16 wherein determining that the transaction log on the RDMS includes the first transaction that had not yet been replicated at the first data store further comprises:

transmitting, over a network, a first request for a last committed transaction to a first replication component for the first data store; and receiving, from the first replication component, the last committed transaction of the first replication component for the first data store.

18. The non-transitory machine-readable storage medium of claim 17, wherein synchronizing the transaction log of the RDMS with the first data store further comprises:

rolling back the first transaction that had not yet been replicated at the first data store prior to the RDMS being in service.

19. The non-transitory machine-readable storage medium of claim 16, wherein determining that a second transaction from the second data store is unconfirmed at the RDMS further comprises:

receiving, over a network, a second request for a last committed transaction for the second data store from the second replication component; and responsive to receiving the request from the second replication component, sending the last committed transaction for the second data store to the second replication component, the last committed transaction for the second data store being a committed transaction of the transaction log of the RMDS.

20. The non-transitory machine-readable storage medium of claim 19, wherein resynchronizing the transaction log of the RDMS with the second data store further comprises:

replicating the second transaction to the RDMS reapplying the second transaction to a data store in the RDMS.

* * * * *